United States Patent [19]

Claisen

[11] Patent Number: 4,618,321

[45] Date of Patent: Oct. 21, 1986

[54] FOAMING SYSTEM IN PARTICULAR FOR FOAMING REFRIGERATOR FURNITURE

[75] Inventor: Silvano Claisen, Abbiategrasso, Italy

[73] Assignee: Perros Industriale S.p.A., Milan, Italy

[21] Appl. No.: 749,318

[22] Filed: Jun. 26, 1985

[30] Foreign Application Priority Data

Jul. 2, 1984 [IT] Italy .............................. 21715 A/84

[51] Int. Cl.⁴ .......................... B29C 1/00; B29C 5/04; B29D 27/04

[52] U.S. Cl. ................................ 425/88; 425/817 R; 425/62; 264/46.5; 264/46.6

[58] Field of Search .................. 425/34 R, 25, 62, 88, 425/817 R, 126 R; 264/46.4, 46.5, 46.6, 51, 53, 54

[56] References Cited

U.S. PATENT DOCUMENTS

| | | | |
|---|---|---|---|
| 2,629,698 | 2/1953 | Sterling | 264/46.5 X |
| 2,653,139 | 9/1953 | Sterling | 264/46.5 X |
| 2,700,183 | 1/1955 | Beare | 264/46.6 X |
| 3,000,058 | 9/1961 | Thielen | 264/46.6 X |
| 3,002,230 | 10/1961 | Stewart | 264/46.6 |
| 3,344,492 | 10/1967 | Eggeling et al. | 425/88 X |
| 3,677,670 | 7/1972 | Mori et al. | 425/62 |
| 4,197,065 | 4/1980 | Di Rosa | 425/62 X |
| 4,532,093 | 7/1985 | O'Malley et al. | 425/817 R X |

Primary Examiner—J. Howard Flint, Jr.

[57] ABSTRACT

The foaming system, in particular for foaming refrigerator furniture or cabinets, comprises a first path for the translation of first means for independently carrying furniture pieces, possible means for preheating said furniture pieces, an operating station for handling masks, a second path for the translation of second means for independently carrying or displacing mask members and at least a stocking region for stocking the masks and the related furniture piece contained therein.

16 Claims, 1 Drawing Figure

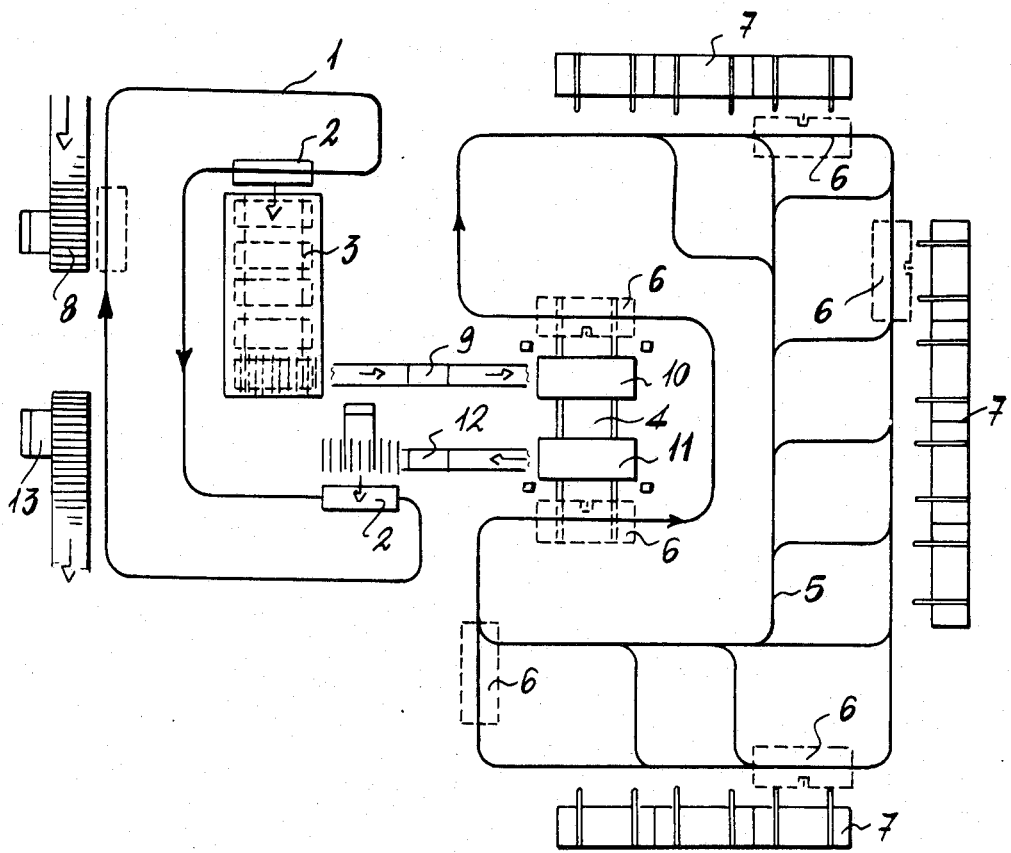

FOAMING SYSTEM IN PARTICULAR FOR FOAMING REFRIGERATOR FURNITURE

The present invention relates to a system for foaming refrigerator furniture or cabinets, water heating devices and the like members which, mainly for heat insulating purposes, are to be subjected to a foaming treatment by polyurethane foamed material or the like processing.

Systems are known for foaming furniture pieces of the above mentioned type, which are substantially of the carousel and fixed line type.

The carousel type of systems provide for the handling of all of the masks being produced thereby the driving member are to be designed depending on the number of said masks and the length of the carousel. Thus it is necessary to distribute the several moving members on a broad surface, with self-evident drawbacks. Those carousel systems, moreover, are to be operated at the rate determined by the curing maximum time.

The fixed line systems, on the other hand, require a great number of members for opening and closing the masks, of foaming members as well as of preheating members. Differently from the carousel systems, it is possible to obtain a high flexibility; however the rather complex structure of the fixed line system is not effective to compensate, up to given production rates, the mentioned high flexibility.

Accordingly the main object of the present invention is to provide such a system which includes both the advantages of the concentration of the mask handling members and the fixed line system advantages.

Another object of the invention is to provide such a system which is effective to be easily changed (i.e. pattern modified) which is a very complex operation in the known systems.

The above and other objects will become more apparent to those skilled in the art from the following disclosure and claims.

According to one aspect of the invention, the system for foaming in particular refrigerator pieces of furniture or cabinets is essentially characterized in that it comprises a first path for the translation of first means for independently carrying furniture pieces, possible preheating means for preheating said furniture pieces, an operating station for handling masks, a second path for the translation of second means for independently carrying masks and at least a stocking region for stocking therein said masks and the related furniture piece contained therein.

The system according to the invention is schematically illustrated, by way of an exemplary but not limitative embodiment, in the sole accompanying FIGURE.

With reference to the FIGURE, the system essentially comprises a first path 1 for the translation of wire-driven carriages 2, a pre-heating oven 3, an operating station for handling masks, indicated overally at 4, a second path 5 for the translation of carriages 6 and at least a stocking region, for stocking said masks, indicated at 7.

The arrangement of the several system forming parts afford the possibility of using a single pre-heating oven 3 and a single operating station 4 for handling masks, as it will be more apparent from the following description of the operating cycle.

In order to better illustrate the system operation suppose to start with a void mask at the location 10 of the station 4.

A pre-assembled furniture piece is taken by the head of a preassembling line 8 from a carriage 2 and displaced, along the line 1, through the oven 3 thereat the furniture piece is held for the time necessary for preheating it. From the oven 3, by means of a transfer member 9, the furniture piece is brougth to the station 4 and introduced into the mask which is awaiting for it in an open condition at the location 10.

Immediately after the automatic closure step of the mask, is carried out the polyurethane injection step and, upon ending said injection step, the mask will be ready for being transferred from the location 10 to a carriage 6 effective to displace, along the path 5, the mask and related furniture piece to a free location of the stocking region 7. That same carriage, by continuing its stroke, will take from the region 7 a mask the furniture piece whereof has already obtained the desired curing and carries it to the location 11 of the station 4 thereat there are carried out the mask opening and the discharging of the furniture piece which is sent, through the transfer means 12, to a dispensing zone 12' therefrom a carriage transfer it, along the path 1, to the end assembling line 13.

The now void mask at the location 11 is transferred to the position 10 in such a way as to be ready for receiving a new furniture piece as sent from the pre-heating oven 3, to continue the operating cycle.

In the illustrated embodiment, two locations 10 and 11 are provided in the station 4 for discharging the furniture piece from the location 11 and for loading another furniture piece to the position 10.

In other embodiments, not illustrated but coming within the invention scope, the station 4 may also comprise the following solutions, depending on the operation or making cycle:

(a) a single operating location thereat there are carried out in succession the steps of opening the mask, discharging the furniture piece, possibly cleaning the mask, introducing a new furniture piece, closing the mask and foaming;

(b) three operating locations and, more specifically, a first location for opening the mask and discharging the foamed furniture piece, a second location for the optional cleaning and introducing a new furniture piece and a third position for closing the mask and for carrying out the foaming step;

(c) four operating locations and, more specifically, a first locations for opening the mask and discharging the furniture piece, a second location for the optional cleaning step, a third location for introducing a new furniture piece and a fourth location for closing the mask and carrying out the foaming step;

(d) it is also possible to provide two locations on the sides of the station 4 for receiving masks in a rest condition before the opening step and after the foaming step, independently from the number of locations provided in that same station 4.

It should be pointed out that the thus designed system, in particular due to the provision of individual transportation or driving means (consisting, in the illustrated embodiment, by wire-driven carriages) affords the possibility of obtaining an alternative path which may be extended in such a way as to reach, for example, the tool shop and/or the maintenance shop for carrying out possible modifications or repairs to the mask and/or related male member, without negatively affecting the system operating rate.

It should moreover be pointed out that the above disclosed system is essentially a modular assembly which may be possibly associated with other like or equivalent modules with respect to the number of locations in the station 4.

What is claimed is:

1. A system for foaming in particular refrigerator furniture pieces, which comprises a first path for the translation of first means for independently carrying furniture pieces, pre-heating means for pre-heating said furniture pieces, on operating station for handling masks, a second path for the translation of second means for independently carrying masks and at least a stocking region for stocking said masks and the related furniture pieces contained therein.

2. A system according to claim 1, wherein said station comprises at least a location for successively carrying out the steps of opening the mask, discharging the furniture piece, optional cleaning, introducing a new furniture piece and foaming.

3. A system according to claim 2, wherein said station comprises a plurality of locations for carrying out each of the steps of opening the mask, discharging the furniture piece, cleaning, introducing a new furniture piece and foaming.

4. A system according to claim 2 which comprises, laterally of said station, at least a parking station before the opening of the mask and after the foaming step.

5. A system according to claim 1, wherein said first and second paths form respectively a path for handling furniture pieces exclusively and a path for handling furniture pieces contained in the related masks.

6. A system according to claim 1, wherein said first and second path may be advantageously coupled to one another and are of the magnetic strip type and wherein said first and second transportation means are formed by wiredriven carriages.

7. A system according to claim 1, wherein said optional pre-heating means consist of a conventional type of oven.

8. A system according to claim 1, there is formed overally a module effective to be associated with other equivalent modules with respect to the number of locations in said operating station for handling said masks.

9. A system accordng to claim 3, which comprises, laterally of said station, at least a parking station before the opening of the mask and after the foaming step.

10. A system according to claim 2, there is formed overally a module effective to be associated with other equivalent modules with respect to the number of locations in said operating station for handling said masks.

11. A systems according to claim 3, there is formed overally a module effective to be associated with other equivalent modules with respect to the number of locations in said opening station for handling said masks.

12. A system according to claim 4, there is formed overally a module effective to be associated with other equivalent modules with respect to the number of locations in said operating station for handling said masks.

13. A system according to claim 5, there is formed overally a module effective to be associated with other equivalent modules with respect to the number of locations in said operating station for handling said masks.

14. A system according to claim 6, there is formed overally a module effective to be associated with other equivalent modules with respect to the number of locations in said operating station for handling said masks.

15. A system according to claim 7, there is formed overally a module effective to be associated with other equivalent modules with respect to the number of locations in said operating station for handling said masks.

16. A system according to claim 9, there is formed overally a module effective to be associated with other equivalent modules with respect to the number of locations in said operating station for handling said masks.

* * * * *